United States Patent [19]

Seichter et al.

[11] Patent Number: 4,899,628
[45] Date of Patent: Feb. 13, 1990

[54] DYNAMICALLY COMPENSATING COUNTERBALANCE

[75] Inventors: Daniel J. Seichter; David L. Olofson, both of Fond du Lac, Wis.

[73] Assignee: AMCA International Corporation, Hanover, N.H.

[21] Appl. No.: 205,688

[22] Filed: Jun. 13, 1988

[51] Int. Cl.⁴ ............................................. B23B 41/00
[52] U.S. Cl. ............................................. 82/131; 82/1.4
[58] Field of Search ................... 82/1.2, 1.3, 1.4, 118, 82/124, 131, 132, 173; 408/181

[56] References Cited

U.S. PATENT DOCUMENTS

| | | | |
|---|---|---|---|
| 3,180,187 | 4/1965 | McFerren | 82/131 |
| 4,184,321 | 1/1980 | Eckle | 82/131 |
| 4,599,769 | 7/1956 | Latzcho | 408/181 |
| 4,620,464 | 11/1956 | Vaselchencho | 82/1.2 |

FOREIGN PATENT DOCUMENTS 2141054  12/1984  United Kingdom ................... 82/131

Primary Examiner—Frederick R. Schmidt
Assistant Examiner—Blynn Shideler
Attorney, Agent, or Firm—Donald Cayen

[57] ABSTRACT

A dynamically compensating counterbalance enables a numerically controlled contouring head to maintain proper balance through large slide travels, cutting tool radial travels, and weight changes in the cutting tool at high speeds. A counterweight within the contouring head moves oppositely to the slide direction by means of a pair of interconnected fluid cylinders. Slide reciprocation under numerical control pumps the first cylinder to slave the second cylinder and the counterweight connected thereto. The counterweight is of a high density material, thereby enabling the counterweight to have lesser and proportional travel than the corresponding slide travel while maintaining proper counterbalance. Proportional slide and counterweight travels are accomplished by employing cylinders of an unequal areas. The invention includes a servo operated third cylinder in fluid communication with the first and second cylinders. The servo control senses certain imbalances and strokes the third cylinder to alter the fluid in the counterweight cylinder, thereby causing displacement of the counterweight without corresponding displacement of the slide, which remains under numerical control.

44 Claims, 5 Drawing Sheets

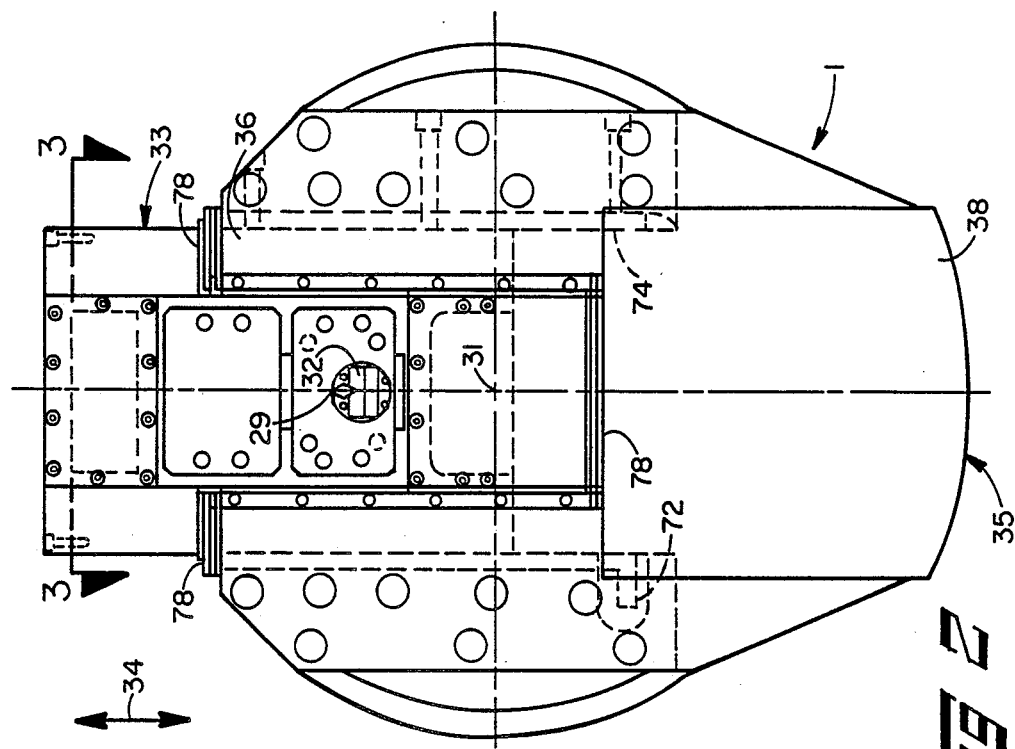
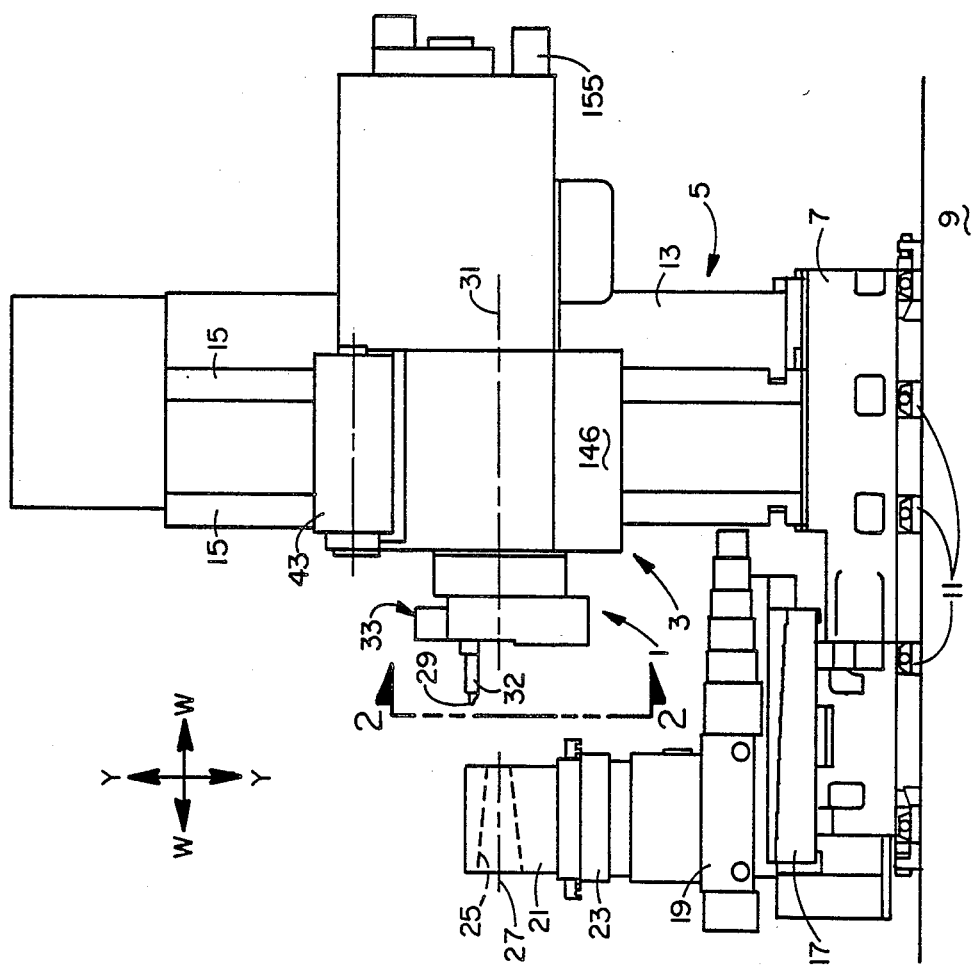

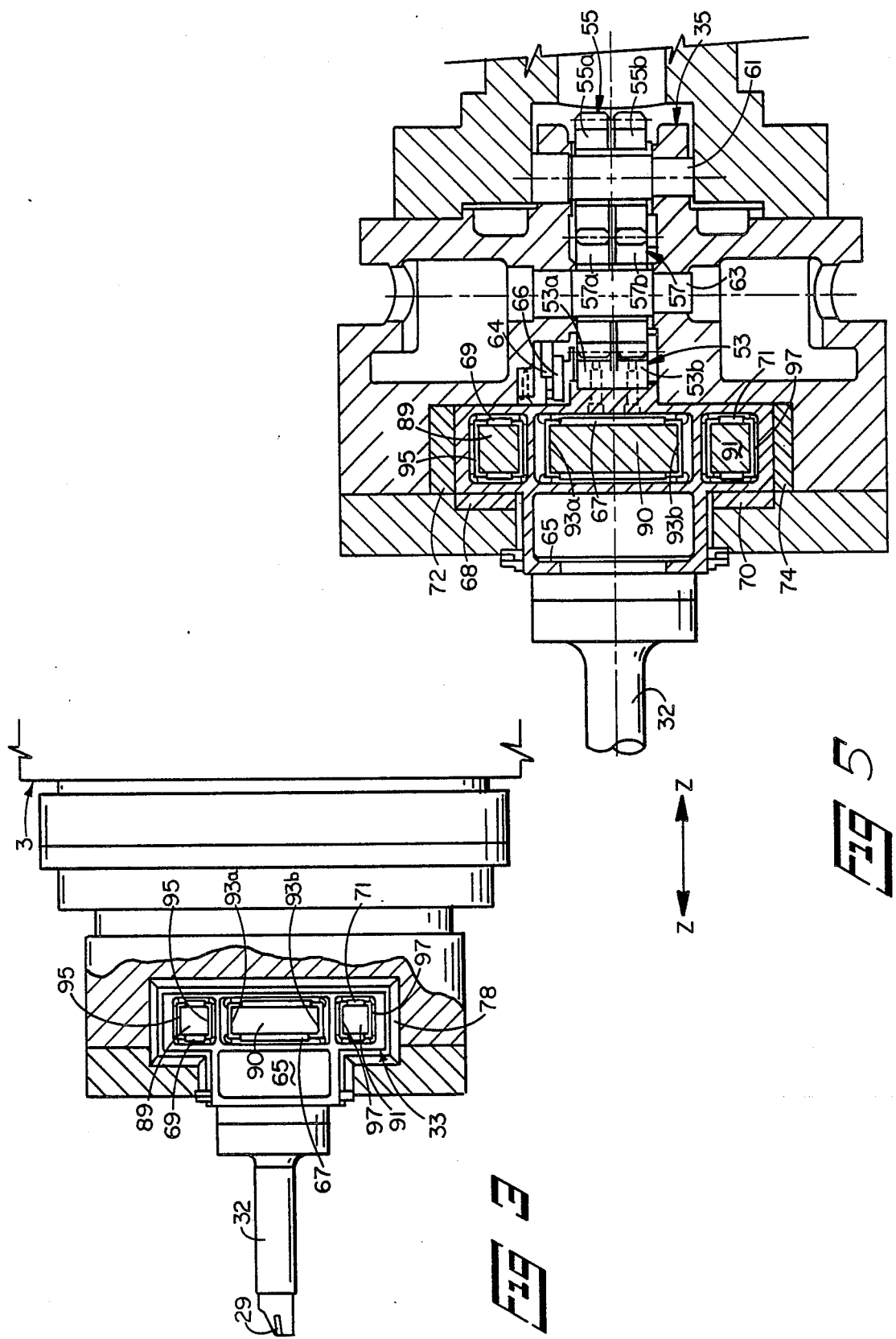

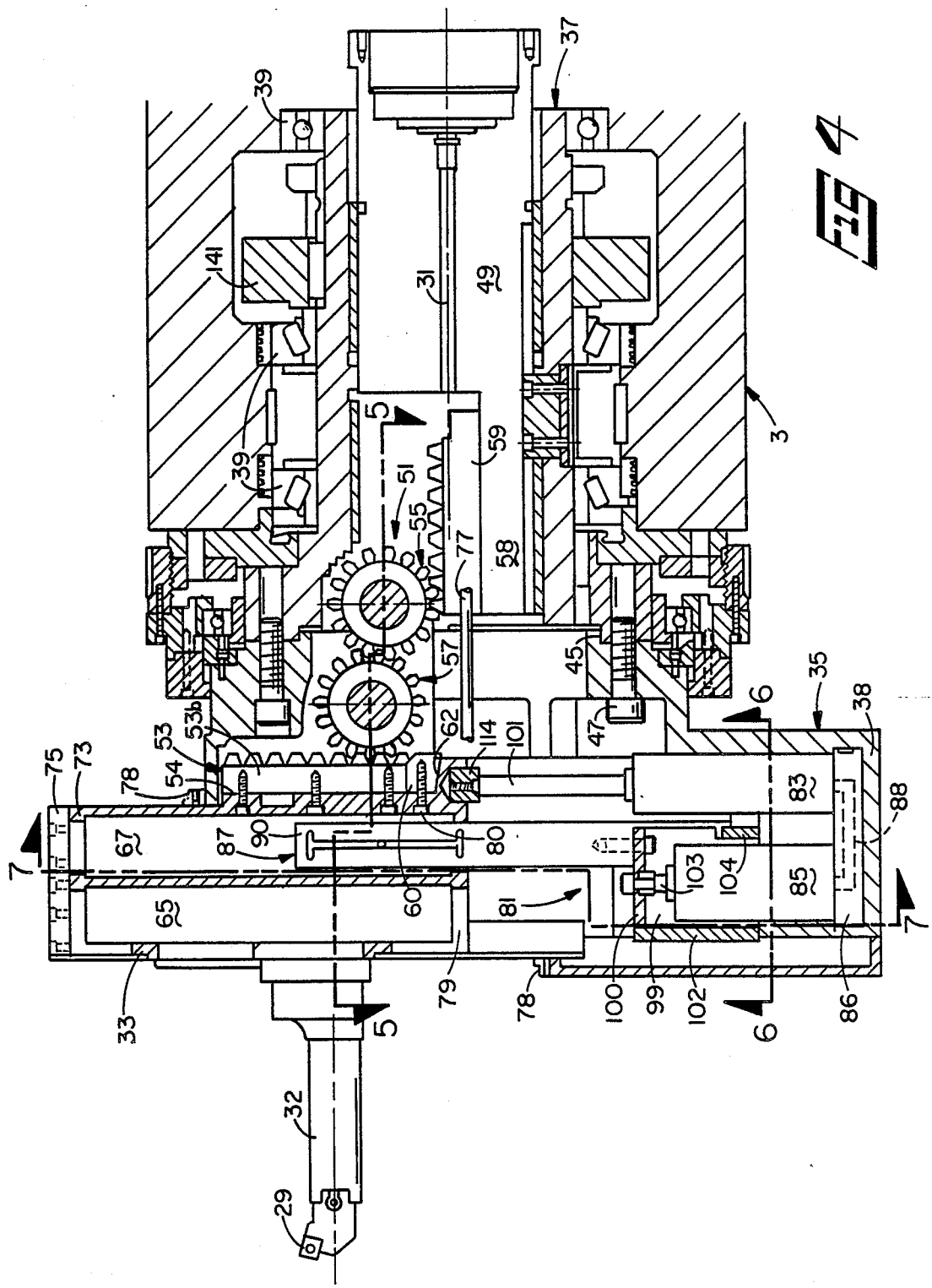

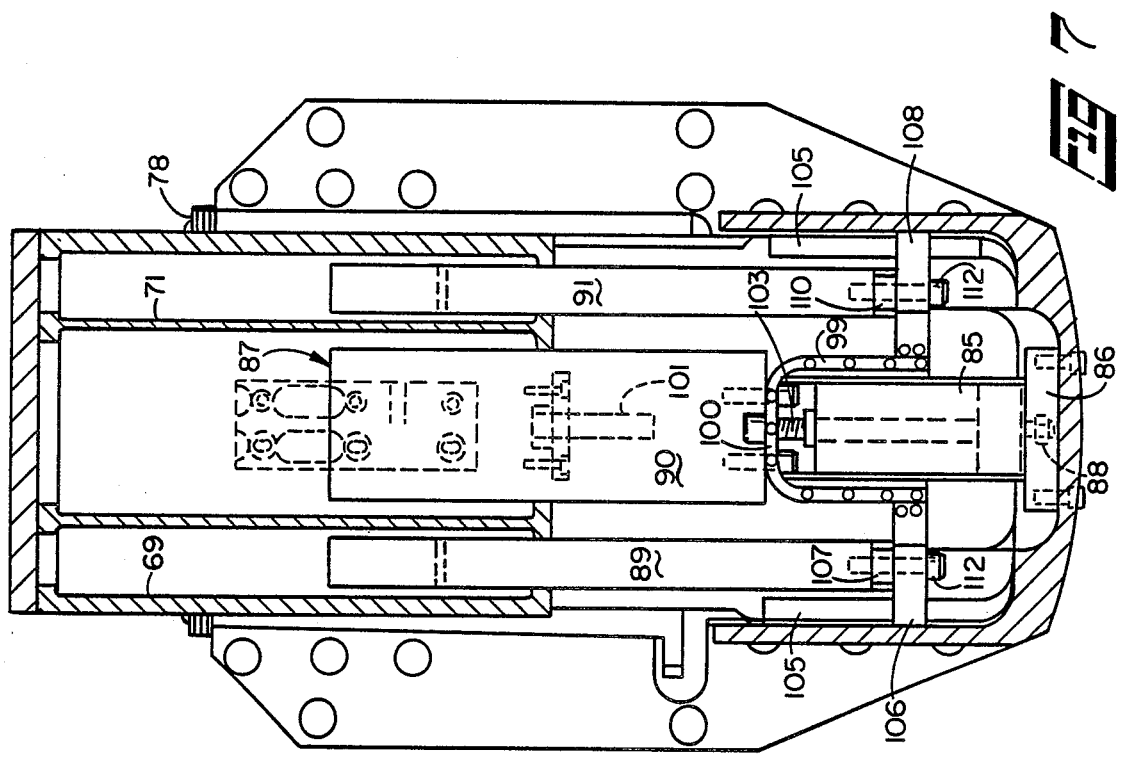
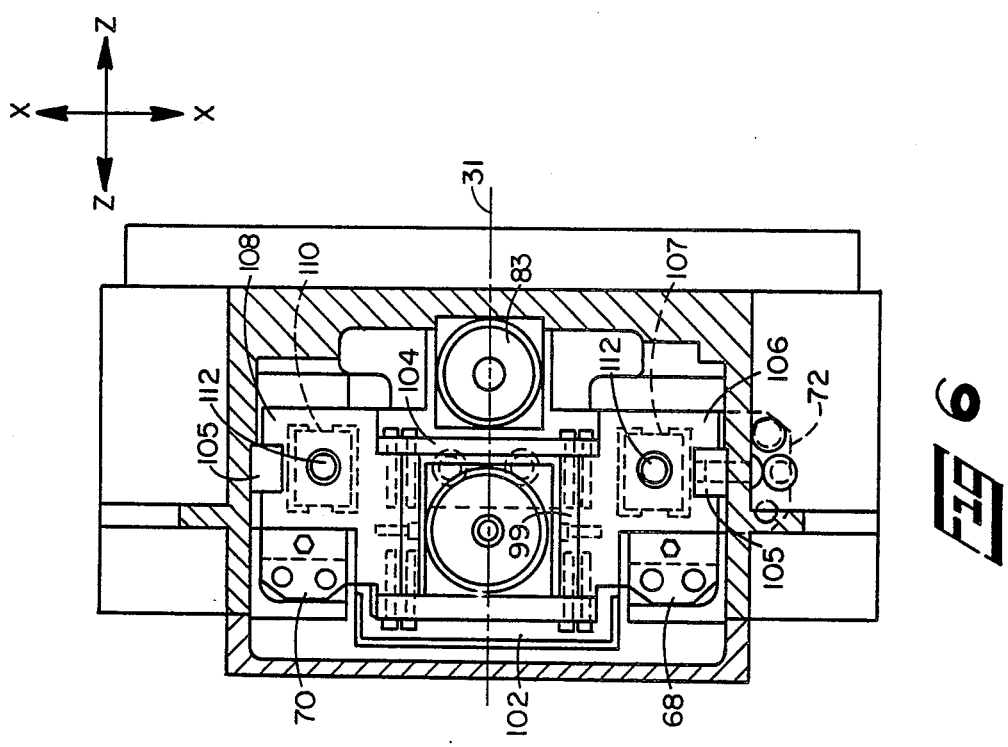

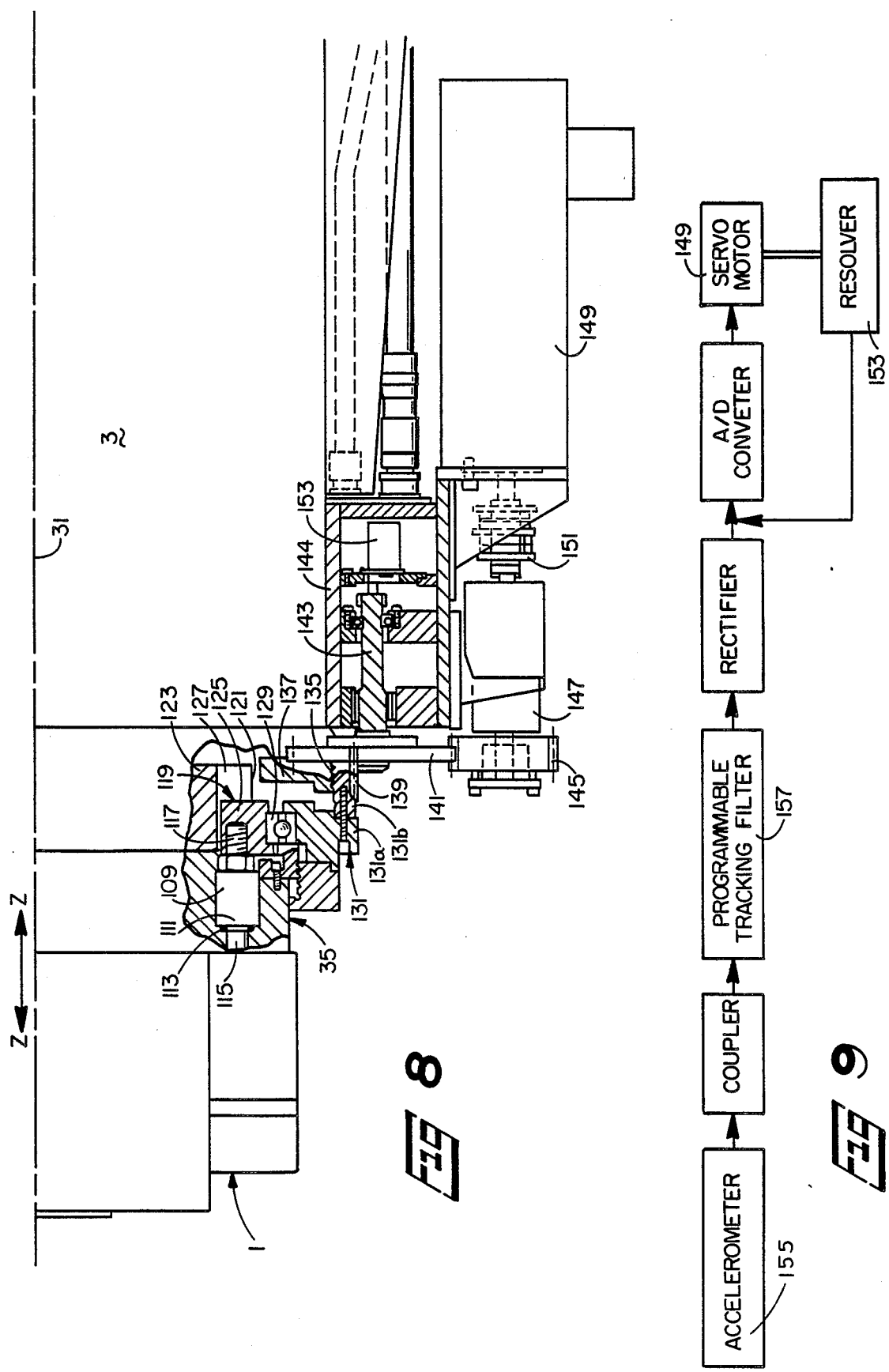

DYNAMICALLY COMPENSATING COUNTERBALANCE

BACKGROUND OF THE INVENTION

1. Field of the Invention

This invention pertains to balancing devices, and more particularly to apparatus for balancing rotating bodies having variable mass centers.

2. Description of the Prior Art

The constant quest for higher productivity and greater accuracy poses difficult problems for many manufacturing industries. The challenges of designing and building equipment capable of efficiently and accurately producing round parts extends to machine tools wherein a contouring head machines a stationary workpiece. An exemplary contouring machine is the Numeribore TM machine manufactured by the Davis Tool Division of AMCA International Corporation.

Because of the high speeds demanded of modern contouring machines, the contouring heads must be accurately balanced. Unbalanced conditions result in inaccurate geometries. When cutting varying bore sizes or other tapered surfaces of revolution with contouring heads, the changing distance of the cutting tool and tool slide from the axis of rotation requires the application of a correspondingly changing counterbalance force.

The balancing problem is aggravated when contouring is performed by relatively small heads. In many cases, the small envelope required for the contouring head to machine specific workpieces makes it very difficult to provide sufficient mass to properly counterbalance the cutting tool and slide. The problem is especially acute in contouring heads having relatively large slide travels and high rotational speeds.

Attempts have been made to solve the foregoing problems. For example, U.S. Pat. No. 4,577,535 describes a contouring machine tool having a counterbalanced contouring head. A pair of counterweights are geared inside the contouring head to move radially to the axis of rotation in the opposite direction as the cutting tool and slide. While generally satisfactory, the system of the U.S. Pat. No. 4,577,535 has a maximum operating speed that is somewhat lower than desired. U.S. Pat. No. 4,620,464 discloses a counterbalanced boring head, but the tool travel available is very limited. Other known counterbalance systems are also unable to satisfactorily compensate for variations in the positions of the radially moveable parts and variations in the weights of the radially movable parts of high speed contouring heads.

SUMMARY OF THE INVENTION

In accordance with the present invention, a dynamically compensating counterbalance is provided that is operable over wide variations of speeds, center of mass eccentricities, and masses of the eccentric parts. This is accomplished by apparatus that includes fluid actuated counterweights and a servo controlled tuning system.

The dynamically compensating counterbalance may be incorporated into a machine tool contouring head that is mounted for rotation about a central axis. Contouring head mounting may be to the rotary sleeve of a generally conventional headstock. The contouring head includes a housing guided in and bolted to the sleeve. The housing is formed with a generally T-shaped passage, through which a slide is reciprocable in directions radial to the central axis. To the slide is mounted cutting tool.

To provide radial motion to the slide and cutting tool, the contouring head includes a mechanism that is driven by a spindle received within the sleeve. The spindle reciprocates along the central axis under the control of a conventional numerical control system. The drive mechanism between the spindle and the contouring head slide is preferably an anti-backlash drive, such as a wound-up gear train, as is known in the art. Reciprocation of the spindle inside the rotating sleeve produces corresponding radial motion of the slide and cutting tool for varying the diameter or profile of a workpiece being machined by the contouring head.

To compensate for the changing radial position of the slide and the cutting tool during contour machining, the contouring head of the present invention includes a counterweight that is received within hollow regions of the contouring head slide and housing. The counterweight reciprocates parallel to, in the opposite direction of, and in the same general plane as the slide. In the preferred embodiment, opposite reciprocation of the counterweight in correlation with the slide is accomplished by providing the counterbalance system with at least two fluid cylinders having their respective casings secured to the contouring head housing. The piston rod of one of the cylinders is connected to the slide. The piston rod of the second cylinder is connected to the counterweight. The piston side of the first or slide cylinder is ported to the piston side of the second cylinder, with a fixed amount of incompressible fluid trapped between the two cylinders. There need be no fluid on the piston rod side of either cylinder.

The counterweight and slide are designed such that their respective centers of mass are radially opposite of the central axis of rotation, as viewed longitudinally along the central axis, irrespective of their relative positions within the contouring head housing. Further, the counterweight center of mass is located between the central axis and the second or counterweight cylinder. Consequently, when the contouring head is rotated about the central axis, the counterweight exerts a centrifugal force on the fluid in the second cylinder, thereby producing pressure on the pistons in both cylinders. Because the slide is under numerical control, the pressure in the cylinders has no effect on the slide position.

As the slide is moved radially within the housing by the numerically control spindle, the first cylinder piston is moved an equal distance. The fluid trapped between the two cylinders flows between their respective piston ends to cause the second cylinder piston to move a distance proportional to the slide and first cylinder piston travel. The two cylinders are arranged within the housing such that the counterweight travels in the opposite direction as the slide. The pressure produced by the centrifugal force of the counterweight on the fluid in the second cylinder properly keeps both cylinders full of fluid when the slide is traveling in the direction away from the first cylinder. Thus, the slide and first cylinder piston act as a pump that slaves the second cylinder piston and counterweight to counterbalance the radially moving slide and tooling.

Because of the space limitations imposed on commercially acceptable contouring heads, the counterweight includes some components that are preferably made of a high density material. Further, the counterweight mass is preferably greater than the mass of the slide and tool holder. Accordingly, the counterweight travel need not be as great as the corresponding slide travel to properly counterbalance the slide. Scaling the relative travels of the slide and counterweight to a ratio other than unity may be accomplished by utilizing cylinders of unequal areas.

Further in accordance with the present invention, the contouring head is compensatable in a dynamic mode to correct out-of-balance conditions without moving the slide. Slight but detrimental imbalances can arise due to variations or inaccuracies in the assumed locations or masses of the various rotating parts, such as the tooling, or in the scaling of the slide and counterweight cylinders. To provide dynamic compensation, the present invention includes a third hydraulic cylinder. The third or dynamic compensating cylinder may be single acting, with fluid only on the piston end. The third cylinder piston end is located within the contouring head housing, with the fluid therein being connected in a closed system with the fluid of the first and second cylinders. Thus, a definite amount of fluid is trapped in the three cylinders and in the passages therebetween.

The third cylinder piston rod is connected to a compensating ring that is guided on the headstock sleeve for rotation therewith. The compensating ring is reciprocable relative to the sleeve and contouring head housing. Reciprocation of the ring on the sleeve moves the third cylinder piston relative to the contouring head housing. Third cylinder piston motion varies the amount of fluid in the third cylinder piston end. The centrifugal force produced by the rotating counterweight acting on the second cylinder creates pressure on the trapped fluid. The fluid pressure assures that the third cylinder piston end is always filled with fluid as the compensating ring reciprocates the third cylinder piston. Because the slide is under numerical control, the first cylinder piston does not change position with changes in the fluid within the second and third cylinders. In that manner, out of balance conditions within the design capacity of the counterbalance system are compensateable without moving the slide. To avoid a concentrated force on the compensating ring at the connection thereof with the third cylinder as the compensating ring is moved axially, it is preferred that three or more cylinders be approximately equidistantly spaced circumferentially around the compensating ring and housing.

Reciprocating motion of the compensating ring may be by means of an annular threaded member fixed to the headstock. A collar has threads that engage those of the threaded annular member. The collar is fabricated with gear teeth that connect through a suitable drive train to a servo motor. Energizing the servo motor causes the collar to rotate relative to the headstock and threaded annular member, thereby causing the collar to axially move relative to the headstock. The compensating ring is coupled to the collar by means of a thrust bearing, such that the compensating ring moves axially with the collar. As a result, energizing the servo motor rotates the collar relative to the headstock, and, by means of the threads, axially displaces the collar, compensating ring, and third cylinder pistons to vary counterweight radial position without movement of the contouring head slide. The thrust bearing between the collar and the compensating ring permits relative rotation between those two parts under the influence of the servo motor.

To control the servo motor for providing dynamic counterbalance to the contouring head of the present invention, an accelerometer of known design maybe mounted to the machine tool headstock. The accelerometer is installed within a control circuit so as to sense unbalanced forces in at least the plane of greatest headstock compliance. The signals from the accelerometer are fed through a tracking filter that removes all frequencies other than that of the spindle speed. The filtered signal is then used to control the servo motor. The result is that the dynamically compensating system operates to compensate only those vibrations that have the same frequency as the spindle rotation and that produce vibrations in the headstock plane of maximum compliance.

Other advantages, benefits, and features of the present invention will become apparent to those skilled in the art upon reading the detailed disclosure.

BRIEF DESCRIPTION OF THE DRAWINGS

FIG. 1 is a side view of a typical machine tool that advantageously uses the dynamically compensating counterbalance of the present invention.

FIG. 2 is a view taken along lines 2—2 of FIG. 1.

FIG. 3 is a cross sectional view taken along lines 3—3 of FIG. 2.

FIG. 4 is a cross sectional view taken through the central axis of rotation of the contouring head of the present invention.

FIG. 5 is a cross sectional view taken along lines 5—5 of FIG. 4.

FIG. 6 is a cross sectional view taken along lines 6—6 of FIG. 4.

FIG. 7 is a cross sectional view taken along line 7—7 of FIG. 4.

FIG. 8 is a view, partially broken and partially in cross section, of the mechanism for providing dynamic compensation for the counterbalance system of the present invention.

FIG. 9 is a block diagram of the control for the dynamically compensating counterbalance of the present invention.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Referring to FIG. 1, reference numeral 1 indicates a contouring head that includes the present invention. The contouring head 1 is shown mounted to the headstock 3 of a numerically controlled machine tool 5. However, it will be understood that the invention is not limited to machine tool applications.

General

The machine tool 5 includes a bed 7 secured to a foundation 9 by means of leveling jacks 11. An upright column 13 is fastened to the bed 7. The column 13 is manufactured with vertical ways 15 for reciprocatingly guiding the headstock 3 along a Y axis. The column way faces define a vertical plane.

A saddle 17 is mounted to the bed 7 for reciprocating in first horizontal directions along a W axis parallel to the plane defined by the faces of the column ways 15. The saddle 17 includes ways for reciprocatingly mounting and guiding a table 19. Table motion is in horizontal directions along an X axis perpendicular to the saddle motion.

A workpiece 21 may be secured directly to the machine table 19. Alternately, as illustrated, the workpiece 21 may be fastened to holding fixtures 23, such as a rotary table or work changing pallet, as are known in the art. The workpiece is shown with a representative tapered surface of revolution 25 having a horizontal axis 27 that is to be machined by the machine tool 5. Surface 25 is depicted as a bore, but it will be appreciated that external surfaces of revolution are also machinable using the present invention.

Referring to FIG. 4, a sleeve 37 is mounted in the machine headstock 3 for rotation about a central axis 31. The central axis 31 defines a Z axis. The sleeve 37 is journaled in the headstock by means of bearings 39. Rotary motion to the sleeve is provided by a bull gear 41 keyed thereto. To rotate the bull gear 41, it meshes with a suitable drive train (not shown) powered by a motor 43, FIG. 1.

Contouring Head

Machining of the workpiece bore 25 is accomplished by the contouring head 1, which is mounted to the headstock 3 for rotation about the central axis 31. The contouring head includes a cutting tool 29 that is fastened to a tool post 32. In turn, the tool post 32 is fixed to a slide 33. Looking also at FIG. 2, the slide 33 is reciprocable within a housing 35 in a plane perpendicular to the central axis. Slide reciprocation is in the directions of arrow 34 between a housing open end 36 and a closed end 38. The slide reciprocates by means of a mechanism to be described presently.

To rotatingly mount the contouring head 1 to the contouring machine headstock 3, the contouring head housing 35 is attached to the headstock sleeve 37. Returning to FIG. 4, the contouring head housing 35 is formed with a pilot 45 that accurately fits within a bore in the sleeve. Screws 47 securely attach the housing to the sleeve for rotation therewith.

To reciprocate the slide 33, a spindle 49 is axially slideable within the sleeve 37 for driving the slide through a drive train 51. In the illustrated construction, the drive train 51 comprises a set of racks 53 secured to an interior surface 54 of the slide. Two sets of meshing gears 55 and 57 are interposed between the spindle 49 and the slide racks 53. To drive the gears 53 and 57 and the slide, a rack 59 is attached to a flatened spindle extension 58.

Preferably, the gear train 51 is of an anti-backlash design. Looking also at FIG. 5, the set of gears 55 comprises two gears 55a and 55b journaled on a common shaft 61 that is mounted in the contouring head housing 35. The second set of gears 57 comprises two gears 57a and 57b mounted on a common shaft 63. Gear 57a meshes with rack 53a of the rack set 53, which is fixed to the slide interior surface 54. Rack 53b is adjustable on the slide. For that purpose, a wedge 60 (FIG. 4) is interposed between one end of the rack 53b and a sloped surface 62 formed on the slide 33. The wedge 60 is held in place by screws 80. By tightening the screws 80, the wedge slides along the surface 62 and displaces the rack 53b. As a result, the gears 57a, 57b and 55a, 55b are rotated against the spindle rack 59 and slide rack 53a to take all backlash out of the drive train 51. If desired, a predetermined amount of preload can be installed in the drive train by means of the wedge.

As a result of the construction of the anti-backlash drive train 51, axial movement of the spindle 49 along the Z axis causes very accurate corresponding motion of the contouring head slide 33 in a vertical plane perpendicular to the Z axis. To provide feedback of the slide position within the housing 35, the contouring head 1 includes an Inductosyn scale 64 mounted to the housing and a slider 66 mounted to the slide, FIG. 5. The Inductosyn scale 64 and slider 66 are incorporated into the contouring machine numerical control system, as is known in the art.

To accurately retain and guide the slide 33 within the housing 35, the contouring head 1 comprises several gibs, as are best shown in FIGS. 2, 5, and 6. Gibs 68 and 70 retain the slide against the housing in a direction parallel to the Z axis. Gib 72 retains the slide in a direction transverse to the Z axis against a plate 74 fastened to the housing. Lubrication is provided to the various mating surfaces between the slide, gibs, and plate 74 by suitable passages drilled through those components and through the housing. Lubrication is supplied to the housing via a flexible conduit 77 connected between the spindle 49 and the slide, FIG. 4. Conventional wipers and seals 78 minimize lubrication leakage outside the sleeve and contamination entrance into the housing, FIG. 2.

Counterbalance System

Looking especially at FIGS. 3, 4, and 5, the contouring head slide 33 is seen to have four internal cavities. The first cavity 65 provides space for a mechanism for rigidly but removably mounting the tool post 32 to the slide. Such mechanism does not form any part of the present invention, and therefore it will not be discussed further herein. Slide 33 further defines a central cavity 67 and a pair of smaller side cavities 69 and 71. The cavities 65, 67, 69, and 71 are open to the outer end 73 of the slide, and they are covered by a plate 75. The cavities are exposed at the slide inner end 79.

To compensate the mass of the slide 33, tool post 32, and other components mounted to the slide as they are moved radially to the central axis 31 by the spindle numerical control system, the present invention comprises a counterbalance system 81. In the preferred embodiment, the counterbalance system 81 includes a pair of hydraulic cylinders 83 and 85 and a counterweight 87. Depending on the size of the contouring head 1, more than one cylinder 83 and/or cylinder 85 may be employed. Both of the hydraulic cylinders 83 and 85 may be single acting with hydraulic fluid present only on their respective piston ends. The respective cylinder casings are joined to a common manifold 86 that in turn is fastened to the contouring head housing 35. The manifold 86 is manufactured with internal passages 88 that connect the piston ends of the two cylinders to each other. Consequently, a fixed quantity of fluid is trapped in the cylinder piston ends and in the manifold passages 88.

Counterweight 87 is composed of three major pieces and several smaller components. Referring also to FIGS. 6 nd 7, the first major counterweight piece 90 has a cross section that slideingly fits within the slide central cavity 67. U-shaped rails 93a and 93b secured to the inside of the cavity 67 guide the counterweight piece 90 therein. Similarly, major counterweight pieces 89 and 91 are guided by rails 95 and 97 within the housing cavities 69 and 71, respectively. To reduce friction between the counterweight and the rails 93a, 93b, 95, and 97, the sliding surfaces of the three major pieces 89, 90, and 91 are preferably coated with a low friction material, such as Rulon anti-friction material.

Referring especially to FIGS. 4, 6, and 7, the interconnection between the slide 33 and the counterweight 87 will be explained. Reference numeral 99 represents a horseshoe bracket having a base leg 100. The piston rod 103 of the cylinder 85 is connected to the horseshoe bracket base leg 100. To the front face of horseshoe bracket 99 is fastened a top plate 102. A smaller bottom plate 104 is fastened to the back side of the horseshoe bracket within an appropriate cutout. Fasteners extending through the horseshoe bracket and front plate 102 and back plate 104 secure a pair of bottom plates 106 and 108 thereto. The bottom plates 106 and 108 are located in general alignment with the slide cavities 69 and 71, respectively. Spacers 107 and 110 are interposed between the bottom plates 106 and 108 and one end of the counterweight pieces 89 and 91, respectively. The counterweight pieces are secured to the respective bottom plates by screws 112. Thus, counterweight 87 includes the bracket 99; the plates 102, 104, 106, and 108; and the spacers 107 and 110. The thickness of the spacers 107 and 110 can be varied to change the locations of the counterweight pieces 89 and 91. In that manner, optimum counterweight location can be obtained to accommodate such variables in changes in the tooling position on the slide 33.

The piston rod 101 of the cylinder 83 is connected to the slide, as by a nut 114 fastened at the slide inner end 79.

As the numerically controlled spindle 49 reciprocates the slide 33 through the drive mechanism 51, the fluid in cylinder 83 is forced out of or drawn into its piston end. Simultaneously, fluid is forced into or drawn out of the piston end of the cylinder 85. As a consequence, the horseshoe bracket 99; plates 102, 104, 106, 108; spacers 107 and 110; and counterweight major pieces 89, 90, and 91 reciprocate in unison with and in the opposite direction as the slide.

In FIGS. 1-6, the contouring head slide 33 and tool post 32 are shown at the position of maximum radial travel, that is, at the farthest design distance from the central axis 31. In that situation, the piston rod 101 of the cylinder 83 is fully extended, and the piston rod 103 of the cylinder 85 is fully retracted. Moving the slide toward the central axis by means of the spindle 49 pushes the piston rod 101 into the cylinder 83. Fluid forced from the cylinder 83 flows through the manifold passage 88 and enters the piston end of cylinder 85. Piston rod 103 is forced out of the cylinder 85, thereby moving the counterweight 87 toward the central axis, and the slide tends to swallow the oppositely moving counterweight. Because the counterweight 87 is located in the same general plane of rotation as the slide, problems with dynamic imbalance at high rotational speeds are minimized.

When the contouring head 1 is not rotating, the pressure of the fluid in the cylinders 83 and 85 and in the manifold 86 is zero psi gauge. The counterweight pieces 89, 90, and 91 are designed such that their respective centers of mass are located between the central axis 31 and the cylinder 85. Accordingly, when the contouring head is rotating, the counterweight 87 exerts a centrifugal force on the piston rod 103. In turn, the piston rod force creates the pressure within the hydraulic fluid. The pressure in the fluid assures that the fluid properly fills the cylinder 83 when the slide is fed away from the housing closed end 38 and the cylinder 83. Since the force exerted on the fluid in cylinder 85 increases as the square of the contouring head rotational speed, sufficient hydraulic pressure is always available for proper counterbalance operation.

It is a feature of the present invention that the respective travels of the slide 33 and counterweight 87 need not be equal. Counterweight travel may be proportionately scaled relative to slide travel. Preferably, proportional scaling is accomplished by designing the cylinders 83 and 85 with proportional areas. In the embodiment illustrated, the cylinder 85 has a greater piston area than cylinder 83, such that a given travel of the slide produces a lesser travel of the counterweight.

To permit lesser counterweight travel than corresponding slide travel while maintaining counterbalanced conditions, the counterweight pieces 89, 90, and 91 are fabricated from a high density material. A suitable material is a carbon tungsten alloy powder that is fused into the particular shapes of the counterweight pieces. Such a material has a density approximately 2.6 times greater than that of steel. To maximize the mass of the counterbalancing components, the front plate 102, back plate 104, side plates 106 and 108, and the spacers 107 are also made from the high density material. The high density counterweight pieces provide the significant advantage of occupying minimum space within the slide 33 and housing 35, and also of being able to function properly at radial positions relatively close to the central axis 31. The high density components and travel scaling are very important in the design of the contouring head 1, which has a small envelope but relatively large slide travel.

With the slide 33 at the position of maximum radial travel, the counterweight 87 protrudes a relatively great distance from the slide inner end 79. To guide the protruding counterweight, a pair of keys 105 are fastened to the housing 35 near the closed end 38 thereof, as is best shown in FIG. 6. Complimentary notches formed in the counterweight bottom plates 106 and 108 slide over the keys 105. Thus, guidance is provided for the counterweight portion that protrudes beyond the slide guide rails 93, 95, and 97, which are best shown in FIGS. 3 and 5.

Dynamic Compensation

Further in accordance with the present invention, the dynamically compensating counterbalance is capable of adjusting the radial position of the counterweight 87 without corresponding motion of the slide 33. Such counterweight adjustment is important for optimum balance under certain conditions where imbalances can produce out-of-round geometries on the workpiece bore 25, FIG. 1.

In the preferred embodiment, dynamic compensation is performed by apparatus that includes at least one and preferably more compensating cylinders that are ported to the cylinders 83 and 85. Referring to FIG. 8, a fluid cylinder 109 is depicted that has its piston end 111 securely retained in the contouring head housing 35. The compensating cylinder 109 is single acting, with no fluid being present on the side of the piston rod 117. It is desirable that three compensating cylinders be employed, with the cylinders being equidistantly spaced circumferentially around the housing. However, more than three cylinders may be used if required by the specific application. The fluid in the piston end 111 of each cylinder is ported through a seal, such as an O-ring 113, to a respective passage 115 drilled into the housing. If desired, fluid passages that are not integral with the housing may be used. The passages 115 of all the compensating cylinders are connected, such that the cylinders are hydraulically connected to each other. Further, the interior passages of the compensating cylinders are ported internally within the housing to the passage 88 of the manifold 86. Also see FIG. 4. Consequently, the fluid trapped between the two cylinders 83 and 85 also includes the fluid trapped in the passages 115 connected to the compensating cylinders. With a trapped volume of incompressible fluid, the displacement of the piston of any one cylinder will tend to cause a corresponding displacement of the pistons of the other cylinders.

To displace the pistons of the cylinders 109, the rods 117 thereof are connected to a compensating ring 119. In the illustrated construction, the compensating ring 119 is generally annular in shape, and it fits over the periphery 121 of the sleeve flange 123. The compensating ring is formed with lobes 125 that correspond to and receive the respective cylinder piston rods. The lobes 125 interfit within respective cutouts 127 that are machined in the sleeve flange periphery 121. The compensating ring is rotated in unison with the contouring head housing 35 by pins, not shown, extending between those two components.

The compensating ring 119 is capable of axial movement on the housing 35 along the Z axis. Such axial movement alters the volume of fluid in the compensating cylinder piston ends 111 and tends to have a corresponding effect on the volume of fluid in the cylinders 83 and 85. However, under machining conditions, the slide 33 is under the numerical control of the spindle 49 and the wound-up gear train 51. Therefore, no additional fluid enters or leaves the cylinder 83 from the cylinders 109. The entire change in the volume of fluid in the compensating cylinders is accommodated only in the counterweight cylinder 85. Thus, axially moving the compensating ring on the sleeve displaces the piston rod 103 of the cylinder 85 to affect the position of counterweight 87.

Various means, such as a rack and pinion, may be employed to axially reciprocate the compensating ring 119 relative to the contouring head housing 35. In the illustrated construction, axial movement is accomplished by means of a threaded connection between the headstock 3 and the compensating ring. Mounted over the compensating ring 119 is a thrust bearing 129. An annular collar 131, which may be constructed as two pieces 131a and 131b, is fit on the outer diameter of the bearing 129. Collar piece 131b contains internal threads 135. Fixed to the face of the headstock 3 is a ring 137 having external threads that mate with the threads 135 of the collar piece 131b. In order to obtain a fast response from the compensating ring and the compensating cylinders 109, it is preferred that the threads have a relatively high lead, such as approximately 0.5 inches. Thus, it is seen that rotating the collar about the central axis 31 causes it, together with the bearing and compensating ring 119, to move axially along the central axis 31, and thereby cause motion of the piston rods 117 and associated actuation of the cylinder 85.

To rotate the collar 131 and thereby stroke the piston rods 117, the collar piece 131b is formed with external gear teeth 139. The teeth 139 mesh with a gear 141 fixed to a shaft 143 that is suitably journaled in a casing 144. The casing 144 may be attached to the underside of the headstock 3 and is covered by a large cover 146 (FIG. 1). The gear 141 is driven by another gear 145 at the output end of a zero backlash speed reducer 147. In turn, the speed reducer 147 is driven through an anti-backlash coupling 151 by a servo motor 149. Geared to the end of the shaft 143 is a resolver 153.

Operation of the servo motor 149 in a first direction causes the gears 141 and 145 to rotate the collar 131 and translate the compensating ring 119 away from the headstock 3 and toward the left with respect to FIG. 8. The amount of servo motor rotation and thus the compensating ring translation is monitored by the resolver 153. Translating the compensating ring away from the headstock tends to force fluid from the compensating cylinders 109 and into the cylinder 85. As a result, the piston rod 103 and counterweight 89 are forced farther into the slide 33 toward the outer end 73 thereof. Because the center of mass of the counterweight is located between the cylinder 85 and the central axis 31, counterbalance force acting on the contouring head 1 is decreased.

In a similar manner, rotating the servo motor 149 in a second direction opposite the first direction causes the compensating ring 119 to translate toward the headstock 3. The compensating ring draws the pistons of the compensating cylinders 109 with it. The centrifugal force acting on the fluid in the cylinder 85 by the counterweight 87 assures that the compensating cylinders remain filled with fluid. Again, because of the servo lock acting on the slide 38, no additional fluid enters cylinder 83. As a consequence, the counterweight moves slightly toward the slide inner end 79 and away from the central axis 31; the counterbalance force exerted by the counterweight is slightly increased, again without movement of the slide.

Compensation Control

The function of the servo motor 149 is to compensate for contouring machine vibrations that cannot be balanced merely by moving the radial position of the slide 33. To sense the vibrations to be compensated by the present invention, a conventional accelerometer 155 is affixed to the machine 5. In the present instance, the accelerometer 155 is attached to the headstock 3, since the contouring head 1 is mounted to the headstock. See FIG. 1. The accelerometer is preferably designed to sense vibrations in more than one plane, and multi-plane sensing may be used at initial setup to adjust the counterweight in various planes of imbalance. During operation of the dynamically compensating counterbalance of the present invention, imbalance in only the plane of greatest compliance relative to the machine foundation 9 is usually required. Accordingly, if desired, the accelerometer can be used to send signals corresponding to accleration forces for compensation in only one plane. In the application of the invention to the contouring head 1, compliance of the headstock 3 is greatest in a horizontal plane. Consequently, dynamic compensation of the counterweight during contouring head operation may be limited to imbalances produced in a horizontal plane.

To compensate for unbalanced forces in the desired plane sensed by the accelerometer 155, the accelerometer signals are fed to a tracking filter 157, FIG. 9. The tracking filter 157 is designed to block all vibration signals except those having the same frequency as the rotating sleeve 37. As a result, only signals corresponding to headstock vibrations at the same frequency as the sleeve and acting in the desired plane of imbalance are fed to the servo motor 149 for rotating to compensate those vibrations. In that manner, vibrations are compensated by the counterweight 87 without requiring radial repositioning of the slide 33.

Thus, it is apparent that there has been provided, in accordance with the invention, a dynamically compensating counterbalance that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. Counterbalanced rotary apparatus comprising:
   a. a housing adapted to rotate about a central axis;
   b. a slide retained in the housing for reciprocating toward and away from the central axis in a plane perpendicular thereto;
   c. counterweight means reciprocatingly received within the housing and slide for reciprocation in the same general plane as the slide; and
   d. counterbalance means mounted solely within the housing for directly connecting the slide to the counterweight means and for being actuated directly by reciprocation of the slide to reciprocate the counterweight means in synchronization with and in the opposite direction as the slide to thereby provide balancing as the slide reciprocates toward and away from the central axis.

2. The apparatus of claim 1 wherein the counterweight means comprises at least one counterweight piece fabricated of a material having a density greater than the density of steel.

3. Counterbalanced rotary apparatus comprising:
   a. a housing adapted to rotate about a central axis;
   b. a slide retained in the housing for reciprocating toward and away from the central axis in a plane perpendicular thereto;
   c. counterweight means reciprocatingly received within the housing and slide for reciprocation in the same general plane as the slide; and
   d. counterbalance means mounted to the housing and actuated by the slide for reciprocating the counterweight means in synchronization with and in the opposite direction as the slide to thereby provide balancing as the slide reciprocates towards and away from the central axis, wherein the counterbalance means comprises:
      i. first and second fluid cylinders having respective piston ends, and first cylinder having a piston rod connected to the slide and the second cylinder having a piston rod connected to the counterweight; and
      ii. passage means for providing fluid communication between the piston ends of the first and second cylinders,
   so that a fixed quantity of fluid is contained in the passage means and in the piston ends of the first and second cylinders.

4. The apparatus of claim 3 wherein:
   a. the passage means comprises a manifold having fluid passages formed therein; and
   b. the respective piston ends of the first and second cylinders are mounted to the manifold and are in fluid communication with the manifold passages.

5. Counterbalanced rotary apparatus comprising:
   a. a housing adapted to rotate about a central axis;
   b. a slide retained in the housing for reciprocating toward and away from the central axis in a plane perpendicular thereto;
   c. counterweight means reciprocatingly received within the housing and slide for reciprocation in the same general plane as the slide; and
   d. counterbalance means mounted to the housing and actuated by the slide for reciprocating the counterweight means in synchronization with and in the opposite direction as the slide to thereby provide balancing as the slide reciprocates toward and away from the central axis, wherein the counterbalance means comprises:
      i. at least one first fluid cylinder mounted to the housing and having a piston rod connected to the slide;
      ii. at least one second fluid cylinder mounted to the housing and having a piston rod connected to the counterweight means; and
      iii. passage means for providing fluid communication between the first and second cylinders,
   so that slide travel produces corresponding travel of the first cylinder piston rod to displace fluid between the first and second cylinders and thereby cause corresponding travel of the second cylinder piston rod and the counterweight means connected thereto.

6. The apparatus of claim 5 wherein the first and second cylinders have proportional piston areas,
   so that slide travel produces a proportional corresponding counterweight means travel.

7. The apparatus of claim 6 wherein the counterweight means has a mass proportional to the mass of the slide.

8. The apparatus of claim 5 wherein:
   a. the first cylinder has a piston area proportional to the piston area of the second cylinder; and
   b. the counterweight means mass is proportional to the mass of the slide,
   so that the counterweight means reciprocates in travels proportional to the corresponding slide travels to maintain proper counterbalance to the slide.

9. The apparatus of claim 5 wherein:
   a. the slide is formed with at least one cavity therein; and
   b. the counterweight means comprises at least one counterweight piece that is at least partially received within the slide cavity,
   so that the counterweight piece reciprocates at least partially within the slide during slide reciprocation within the housing.

10. The apparatus of claim 9 further comprising rail means secured to the slide cavity for guiding the counterweight piece during reciprocation therein.

11. A contouring head for machining surfaces of revolution on a workpiece comprising:
    a. a housing adapted to rotate about a central axis;
    b. a slide received within the housing for rotation therewith and for reciprocation toward and away from the central axis in a plane perpendicular thereto, the slide including a cutting tool mounted thereon, the slide being formed with pairs of opposed walls that define at least one elongated generally enclosed cavity extending longitudinally therethrough;
    c. counterweight means received within the housing for rotation therewith and for reciprocation in the same general plane as the slide, the counterweight means comprising a counterweight piece having at least a portion thereof received within and surrounded by the enclosed slide cavity for reciprocation within and relative to the slide; and d. means directly interconnecting the slide and counterweight means for directly reciprocating the counterweight means in response to reciprocation of the slide to reciprocate the counterweight means in synchronization with and in opposite directions as the slide, so that the counterweight means compensates for imbalance caused by the slide and cutting tool reciprocation within the housing.

12. The contouring head of claim 11 wherein the slide comprises rail means attached within the slide cavity for guiding the portion of the counterweight piece received therein.

13. In combination with a contouring machine having a headstock; a sleeve rotatable in the headstock about a central axis; and a spindle reciprocatingly received within the sleeve, a contouring head for machining surfaces of revolution on a workpiece comprising:
  a. a housing mounted to the sleeve for rotation therewith;
  b. a slide received within the housing for reciprocating in a plane perpendicular to the central axis toward and away therefrom;
  c. drive means between the slide and spindle for reciprocating the slide in response to reciprocation of the spindle;
  d. counterweight means within the housing and at least partially received within the slide for reciprocating therein; and
  e. counterbalance means connecting the slide to the counterweight means for reciprocating the counterweight means in synchronization with and in opposite directions as the slide reciprocation, so that the counterweight means balances the slide as the slide is reciprocated toward and away from the central axis.

14. The combination of claim 13 further comprising:
  a. rail means mounted within the slide for guiding the reciprocation of the counterweight means within the slide; and
  b. key means mounted within the housing for guiding the reciprocation of the counterweight means within the housing.

15. The combination of claim 13 wherein the counterweight means comprises at least one counterweight piece fabricated from a material having a density greater than the density of steel.

16. A contouring head for machining surfaces of revolution on a workpiece comprising:
  a. a housing adapted to rotate about a central axis;
  b. a slide received within the housing for rotation therewith and for reciprocation toward and away from the central axis in a plane perpendicular thereto, the slide including a cutting tool mounted thereon;
  c. counterweight means received within the housing for rotation therewith and for reciprocation in the same general plane as the slide; and
  d. means interconnecting the slide and counterweight means for actuation by the slide for reciprocating the counterweight means in synchronization with and in opposite directions as the slide, wherein the means interconnecting the slide and counterweight means comprises first and second fluid cylinders, the first cylinder having a piston rod connected to the slide and the second cylinder having a piston rod connected to the counterweight means, the cylinders being in fluid communication with each other, so that reciprocating the slide strokes the first cylinder piston rod to actuate the second cylinder piston rod and thereby reciprocate the counterweight means in synchronization with and in opposite directions to the slide.

17. The contouring head of claim 16 wherein:
  a. the first and second cylinders have respective piston ends; and
  b. the respective piston ends of the first and second cylinders are in fluid communication with each other.

18. The contouring head of claim 16 wherein the means interconnecting the slide and counterweight means further comprises a manifold within the housing and adapted to mount the first and second cylinders thereon, the manifold being formed with passages for providing fluid communication between the first and second cylinders.

19. The contouring head of claim 16 wherein the first and second cylinders have proportional working areas,
  so that reciprocating travel of the slide produces proportional corresponding travel of the counterweight means.

20. The contouring head of claim 19 wherein:
  a. the working area of the first cylinder is less than the working area of the second cylinder; and
  b. the counterweight means is at least partially fabricated from a material having a density greater than the density of steel, so that the counterweight means reciprocates through shorter travels than corresponding travels of the slide to properly counterbalance the slide.

21. In combination with a contouring machine having a headstock; a sleeve rotatable in the headstock about a central axis; and a spindle reciprocatingly received within the sleeve, a contouring head for machining surfaces of revolution on a workpiece comprising:
  a. a housing mounted to the sleeve for rotation therewith;
  b. a slide received within the housing for reciprocating in a plane perpendicular to the central axis toward and away therefrom;
  c. drive means between the slide and spindle for reciprocating the slide in response to reciprocation of the spindle;
  d. counterweight means within the housing and at least partially received within the slide for reciprocating therein; and
  e. counterbalance means connecting the slide to the counterweight means for reciprocating the counterweight means in synchronization with an in opposite directions as the slide reciprocation, wherein the counterbalance means comprises:
    i. at least one first fluid cylinder within the housing having a working piston end and a piston rod connected to the slide;
    ii. at least one second fluid cylinder within the housing having a working piston end and a piston rod attached to the counterweight means; and iii. means for providing fluid communication between the respective piston ends of the first and second cylinders, so that reciprocation of the slide produces corresponding motion of the first and second cylinder piston rods and the counterweight means.

22. The combination of claim 21 wherein the means for providing fluid communication between the respective piston ends of the first and second cylinders comprises a manifold in the housing and having the piston ends of the first and second cylinders secured thereto, the manifold defining passages for porting the piston ends of the two first and second cylinders to each other.

23. The combination of claim 21 wherein the first and second cylinders have proportional areas,
   so that reciprocating slide travel produces proportional travel of the counterweight means.

24. The combination of claim 21 wherein:
   a. the first cylinder has a working area less than the area of the second cylinder; and
   b. the counterweight means comprises at least one counterweight piece made of a material having a density greater than that of steel,
so that reciprocating travel of the slide produces lesser corresponding travel of the counterweight means while enabling the counterweight means to properly counterbalance the slide.

25. The combination of claim 21 further comprising:
   a. numerical control means for controlling the reciprocation of the spindle and slide; and
   b. compensating means acting between the headstock and the contouring head for reciprocating the counterweight means without corresponding reciprocation of the slide.

26. The combination of claim 25 wherein the compensating means comprises:
   a. compensating ring means mounted on the headstock sleeve for rotation therewith and for reciprocation relative thereto; and
   b. at least one compensating cylinder within the contouring head housing and having a piston end that is in fluid communication with the piston ends of the first and second cylinders, the compensating cylinder having a piston rod that is connected to the compensating ring means,
so that reciprocation of the compensating ring means on the sleeve strokes the counterbalance cylinder to displace fluid between the first and second and counterbalance cylinders and thereby stroke the second cylinder piston rod and counterweight means.

27. The combination of claim 26 wherein there are at least three compensating cylinders mounted to the contouring head housing and having respective piston rods connected to the compensating ring means.

28. The combination of claim 26 wherein the compensating means further comprises means mounted to the sleeve and headstock for reciprocating the compensating ring means on the sleeve.

29. The combination of claim 28 wherein the means for reciprocating the compensating ring means comprises:
   a. a threaded member fixed to the headstock;
   b. collar means having threads for mating with the threads of the threaded member;
   c. bearing means for rotatably supporting the compensating ring means on the collar; and
   d. drive means for rotating the collar means on the threaded member fixed to the headstock, so that rotary motion of the collar means produces motion thereof relative to the headstock for reciprocating the collar means and compensating ring means and thereby stroking the compensating cylinder piston rod.

30. The combination of claim 29 wherein the drive means comprises:
   a. a servo motor mounted to the headstock; and
   b. a power train connecting the servo motor to the collar means for rotating the collar means in response to actuation of the servo motor.

31. The combination of claim 30 further comprising:
   a. accelerometer means mounted to the headstock for sensing imbalances and for producing signals corresponding to the imbalances; and
   b. control means for actuating the servo motor in response to the signals produced by the accelerometer,
so that the servo motor is actuated to rotate the collar means and reciprocate the compensating ring means to reciprocate the counterweight means in accordance with signals from the accelerometer to reduce the imbalances.

32. The combination of claim 29 wherein:
   a. the threads on the threaded member and on the collar means are concentric with the central axis; and
   b. the compensating ring means comprises an annular compensating ring having a longitudinal axis concentric with the central axis,
so that rotating the collar means produces axial motion of the collar means and compensating ring along the central axis to stroke the compensating cylinder piston rods.

33. In a machine for machining surfaces of revolution on a workpiece and having a headstock; a flanged sleeve mounted for rotation about a central axis in the headstock; a spindle mounted for reciprocation along the central axis within the sleeve; and a first control means for reciprocating the spindle within the sleeve,
   a dynamically compensated counterbalance comprising:
   a. a housing mounted to the sleeve for rotation therewith;
   b. a slide received within the housing for reciprocation toward and away from the central axis in a plane perpendicular thereto, the slide including a cutting tool adapted to machine the workpiece;
   c. first drive means for reciprocating the slide in response to reciprocation of the spindle within the sleeve;
   d. counterweight means received within the housing for reciprocation in a plane generally perpendicular to the central axis; and
   e. first cylinder means mounted to the housing and actuated by the slide for reciprocating the counterweight means in the opposite direction of and in synchronization with the slide reciprocation.

34. The dynamically compensating counterbalance of claim 33 wherein the first cylinder means comprises:
   a. at least one first fluid cylinder having a piston rod connected to the slide for being displaced thereby in response to reciprocation of the slide; and
   b. at least one second fluid cylinder having a piston rod connected to the counterweight means; and
   c. fluid connection means between the first and second fluid cylinders for trapping a fixed volume of fluid therebetween, so that displacement of the first fluid cylinder piston rod by the slide produces corresponding displacement of the second fluid cylinder piston rod and the counterweight means.

35. The dynamically compensating counterbalance of claim 33 further comprising compensating means for displacing the counterweight means within the housing without displacing the slide.

36. The dynamically compensating counterbalance of claim 35 wherein the compensating means comprises:
   a. a compensating ring mounted to the sleeve flange for rotation therewith and adapted to reciprocate thereon;
   b. means for reciprocating the compensating ring relative to the housing; and
   c. second cylinder means mounted in the housing for displacing the counterweight means in response to reciprocation of the compensating ring.

37. The dynamically compensating counterbalance of claim 36 wherein the means for reciprocating the compensating ring comprises:
   a. a servo motor mounted to the headstock;
   b. accelerometer means mounted to the headstock for producing signals in response to headstock imbalances;
   c. second control means for actuating the servo motor in response to the imbalance signals produced by the accelerometer means; and
   d. second drive means for reciprocating the compensating ring in accordance with servo motor actuation.

38. The dynamically compensating counterbalance of claim 37 wherein the second drive means comprises:
   a. a threaded member mounted to the headstock;
   b. collar means for engaging the threaded member threads and for supporting and guiding the compensating ring thereon; and
   c. means for rotating the collar means on the threaded member in response to actuation of the servo motor to thereby reciprocate the collar means and the compensating ring thereon,
so that actuating the servo motor rotates the collar means and displaces it on the threaded member to thereby displace the compensating ring.

39. The dynamically compensating counterbalance of claim 36 wherein the second cylinder means comprises at least one compensating cylinder mounted to the housing and having a piston rod connected to the compensating ring, the compensating cylinder being in fluid communication with the fluid connection means between the first and second fluid cylinders,
so that reciprocation of the compensating ring displaces fluid in the compensating cylinder to thereby displace the second fluid cylinder piston rod and counterweight means when the slide is under control of the first control means to prevent slide displacement.

40. The dynamically compensating counterbalance of claim 39 wherein the means for reciprocating the compensating ring comprises:
   a. a threaded member fixed to the headstock;
   b. collar means for engaging the threads of the threaded member;
   c. bearing means for rotatably joining the compensating ring to the collar means; and
   d. second drive means for selectively rotating the collar means on the threaded member in opposite direction to thereby reciprocate the collar, bearing means, and compensating ring.

41. The dynamically compensating counterbalance of claim 40 wherein the second drive means comprises:
   a. a servo motor mounted to the headstock; and
   b. power train means for rotating the collar means in response to actuation of the servo motor.

42. The dynamically compensating counterbalance of claim 40 wherein the threads of the collar means and the threaded member have a lead of approximately 0.5 inches.

43. The dynamically compensating counterbalance of claim 40 wherein the axes of the threads on the threaded member and on the collar means are concentric with the central axis,
so that rotating the collar reciprocates the compensating ring axially along the central axis.

44. The dynamically compensating counterbalance of claim 43 wherein:
   a. the compensating ring is formed as an annular member having a longitudinal axis concentric with the central axis; and
   b. there are at least three compensating cylinders spaced circumferentially around the housing with their respective piston rods connected to the compensating ring,
so that reciprocation of the collar means and compensating means displaces the piston rods of the compensating cylinder parallel to the central axis.

* * * * *